(12) United States Patent
Chadwick

(10) Patent No.: US 6,581,954 B2
(45) Date of Patent: Jun. 24, 2003

(54) MULTI-USE MOTORCYCLE APPARATUS AND METHOD THEREFOR

(76) Inventor: Michael Chadwick, 1515 S. 85th St. East, Muskogee, OK (US) 74403

( * ) Notice: Subject to any disclaimer, the term of this patent is extended or adjusted under 35 U.S.C. 154(b) by 77 days.

(21) Appl. No.: 09/893,120

(22) Filed: Jun. 26, 2001

(65) Prior Publication Data

US 2002/0008363 A1 Jan. 24, 2002

Related U.S. Application Data

(60) Provisional application No. 60/214,274, filed on Jun. 26, 2000.

(51) Int. Cl.[7] .............................................. B60R 9/10
(52) U.S. Cl. ..................... 280/491.1; 224/524; 280/402; 70/14
(58) Field of Search ............................... 280/504, 491.1, 280/402; 224/524, 521, 523, 924; 135/141, 148; 403/109.1–109.8, 379.4–379.5, 345, 347, 377, 378; 248/159, 125.8, 346.07; 70/14, 18, 19, 237, 238, 225, 226, 233

(56) References Cited

U.S. PATENT DOCUMENTS

| | | | | | |
|---|---|---|---|---|---|
| 4,441,586 | A | * | 4/1984 | Bernier ........................ | 188/32 |
| 4,635,835 | A | * | 1/1987 | Cole ........................ | 224/42.08 |
| 4,823,997 | A | * | 4/1989 | Krieger .................... | 224/42.03 |
| 4,993,909 | A | * | 2/1991 | Hamman .................... | 414/563 |
| 5,123,802 | A | * | 6/1992 | Bell .......................... | 414/563 |
| 5,315,848 | A | * | 5/1994 | Beyer ............................ | 70/18 |
| 5,385,038 | A | * | 1/1995 | Walker ........................ | 70/14 |
| 5,460,304 | A | * | 10/1995 | Porter et al. ................ | 224/521 |
| 5,782,117 | A | * | 7/1998 | Xavier ........................ | 70/226 |
| 5,938,092 | A | * | 8/1999 | Johnson .................... | 224/521 |
| 6,007,596 | A | * | 12/1999 | Rosen ........................ | 55/491 |
| 6,085,954 | A | * | 7/2000 | Bloemer et al. ............ | 224/509 |
| 6,318,692 | B1 | * | 11/2001 | Cyrell ........................ | 248/317 |

* cited by examiner

Primary Examiner—Anne Marie Boehler
(74) Attorney, Agent, or Firm—Jeffrey Weiss; Craig Weiss; Weiss, Moy & Harris, P.C.

(57) ABSTRACT

A multi-use motorcycle apparatus and method therefor capable of being easily transported and configured into any of three different apparatuses usable for motorcycles: (a) a towing trailer for a motorcycle where the trailer is dimensioned to be coupled to a vehicle receiver hitch; (b) a frame lift for lifting and supporting the frame of a motorcycle; and (c) a motorcycle lock.

20 Claims, 4 Drawing Sheets

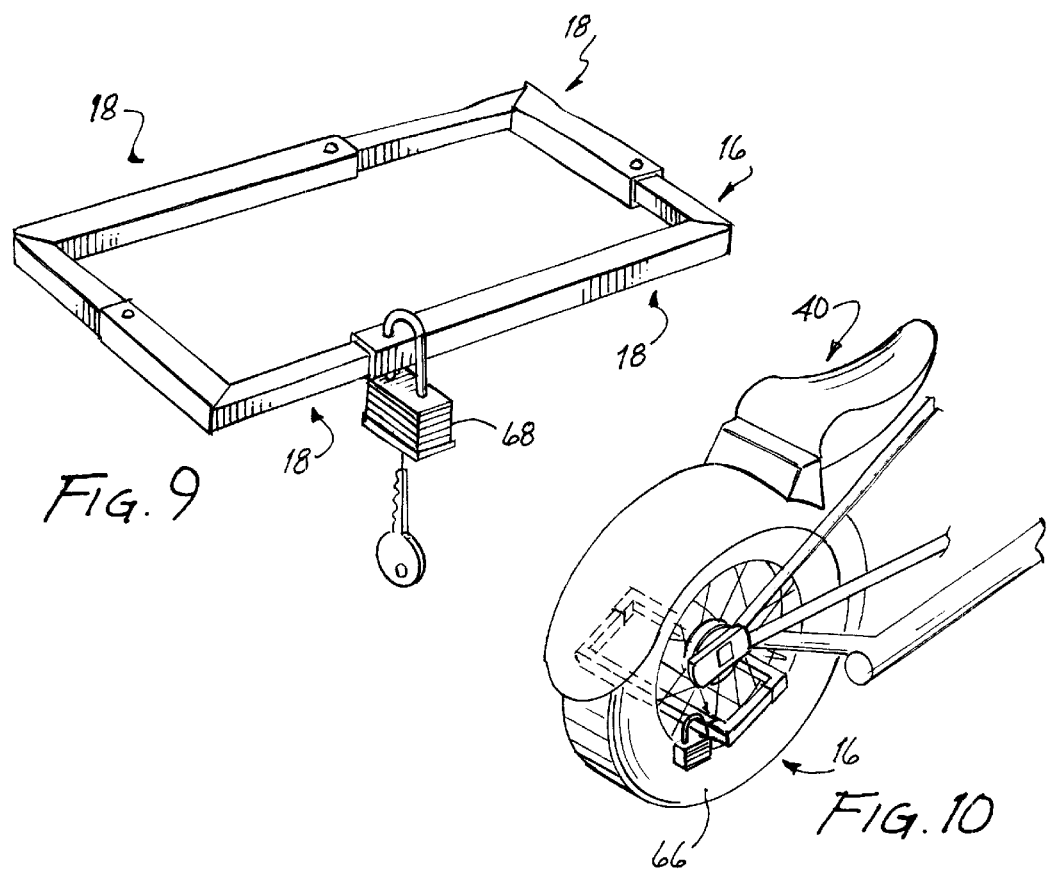
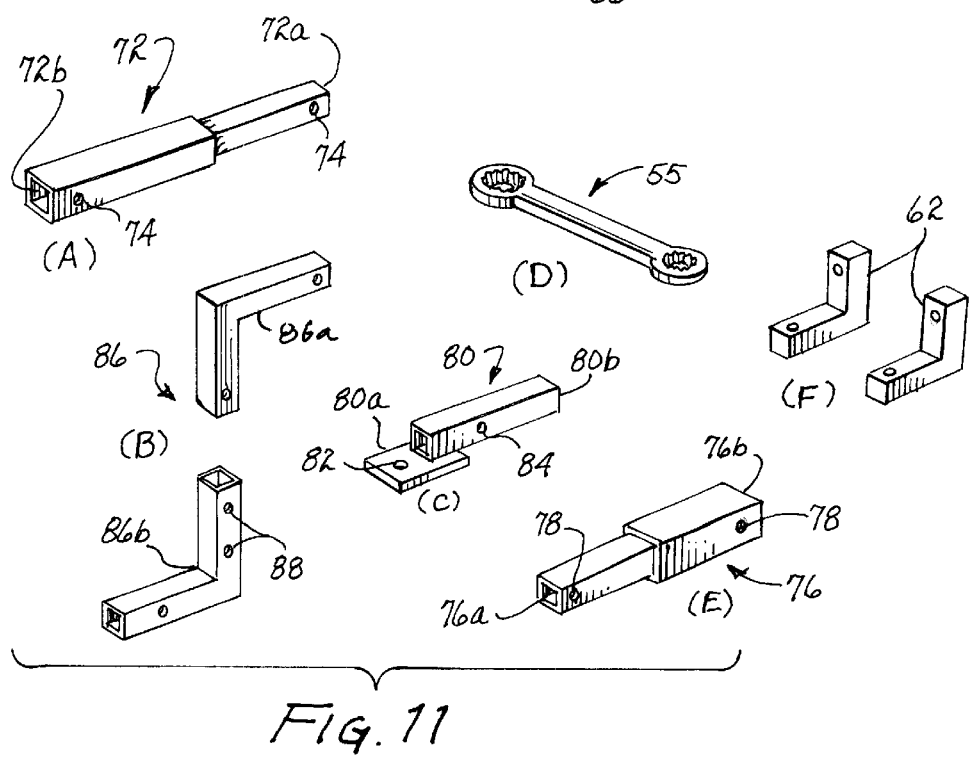

MULTI-USE MOTORCYCLE APPARATUS AND METHOD THEREFOR

RELATED APPLICATION

This application claims priority to a corresponding provisional application U.S. Serial No. 60/214,274, filed Jun. 26, 2000 in the name of the applicant of this application.

FIELD OF THE INVENTION

This invention relates generally to motorcycles and, more specifically, to a multi-use motorcycle apparatus and method therefor capable of being easily transported and configured into three different apparatuses: (a) a motorcycle lock; (b) a frame lift for lifting and supporting the frame of a motorcycle; and (c) a towing trailer for a motorcycle.

BACKGROUND OF THE INVENTION

Those who ride motorcycles are often faced with several needs related to the maintenance, transport and protection of their motorcycle. It is often the case that a motorcycle owner wants to tow their motorcycle behind another vehicle to get it from one place to another when the rider cannot or does not want to ride the motorcycle. This is often the case when one is traveling great distances, over poor road conditions, or when one encounters a mechanical problem. In such a circumstance, the rider must place the motorcycle in the bed of a truck, in the cargo space of a large trailer, or in a towing trailer of some kind attached to another vehicle. Those who do not possess a large trailer or truck, or who find the process of loading and unloading the motorcycle into such spaces cumbersome and time-consuming usually prefer the use of a towing trailer coupled to the rear portion of a vehicle. Towing trailers, however, can often be large and costly.

Another need of most motorcycle owners is to protect their vehicle from being stolen. There are various kinds of motorcycle locks available, and many of them involve placing a lock through the spokes of one of the motorcycle wheels. However, these locks can often be cumbersome, and they represent yet another item that the motorcycle rider must store with his or her motorcycle.

It is also the case that many motorcycle owners need to lift the frame of the motorcycle off of the ground to either change a tire, inspect, and/or repair the motorcycle. There are various jacks and other kinds of frame-lifters available, however, they are often not easily transportable with the motorcycle. Along with the motorcycle lock and the trailer, the frame-lift is yet another item that must be purchased separately and stored with the motorcycle.

A need therefore existed for a single easy to transport multi-use motorcycle apparatus capable of being configured into three different apparatuses: (a) a towing trailer for a motorcycle; (b) a frame lift for lifting and supporting the frame of a motorcycle; and (c) a motorcycle lock.

SUMMARY OF THE INVENTION

An object of the present invention is to provide a multi-use motorcycle apparatus capable of being configured into a towing trailer dimensioned to receive a motorcycle tire and be coupled to a vehicle receiver hitch.

It is a further object of the present invention to provide a multi-use motorcycle apparatus capable of being configured into a frame lift for lifting and supporting the frame of a motorcycle.

It is a still further object of the present invention to provide a multi-use motorcycle apparatus capable of being configured into a motorcycle lock to deter and/or prevent theft of a motorcycle.

It is a still further object of the present invention to provide a multi-use motorcycle apparatus that is lightweight and capable of being easily transported in a motorcycle saddlebag or other container.

BRIEF DESCRIPTION OF THE PREFERRED EMBODIMENTS

In accordance with one embodiment of the present invention, a multi-use motorcycle apparatus is disclosed, comprising, in combination, four substantially L-shaped members each comprising a large cross-section member having a first end and a second end and a small cross-section member having a first end and a second end, the first end of the large cross-section member is coupled to the second end of the small cross-section member, the first end of the small cross-section member of each of the four substantially L-shaped members is dimensioned to be coupled to the second end of the large cross-section member of any other substantially L-shaped member so as to form a four-sided figure when the second end of the small cross-section member of each substantially L-shaped member is coupled to the first end of the large cross-section member of another substantially L-shaped member, and four coupling mechanisms each comprising a first mating member coupled to the first end of each small cross-section member of the four substantially L-shaped members and a second mating member coupled to the second end of each large cross-section member of the four substantially L-shaped members, the first mating member of any one substantially L-shaped member is dimensioned to mate with the second mating member of any other substantially L-shaped member to secure the small cross-section member of any one substantially L-shaped member to the large cross-section member of any other substantially L-shaped member.

In accordance with another embodiment of the present invention, a method for lifting the frame of a motorcycle is disclosed, comprising, in combination, the steps of providing four substantially L-shaped members each comprising a large cross-section member having a first end and a second end and a small cross-section member having a first end and a second end, the first end of the large cross-section member is coupled to the second end of the small cross-section member, coupling the first end of the small cross-section member of each of the four substantially L-shaped members to the second end of the large cross-section member of any other substantially L-shaped member so as to form a four-sided figure when the second end of the small cross-section member of each substantially L-shaped member is coupled to the first end of the large cross-section member of another substantially L-shaped member, providing four coupling mechanisms each comprising a first mating member coupled to the first end of each small cross-section member of the four substantially L-shaped members and a second mating member coupled to the second end of each large cross-section member of the four substantially L-shaped members, mating the first mating member of any one substantially L-shaped member with the second mating member of any other substantially L-shaped member to secure the small cross-section member of any one substantially L-shaped member to the large cross-section member of any other substantially L-shaped member, providing a substantially T-shaped coupler, the coupler comprises a short portion dimensioned to be coupled around one of the four substantially L-shaped members and the coupler comprises a long portion having a female end opposite the short portion, coupling the short portion of the coupler around one of the four substantially L-shaped members, providing a shaft having four sections of descending cross-sectional size, the four sections are dimensioned to nest one inside of another, coupling the largest section of the shaft to the female end of the long portion of the coupler, the remaining sections of descending cross-sectional size extend away from the four substantially L-shaped members, positioning the coupler so that the long portion is projecting at a ninety degree angle from the top side of the four-sided figure formed by the L-shaped members, placing the four-sided figure under a motorcycle frame with the shaft extending in an upward direction, and pushing down the shaft until the four-sided figure contacts and then lifts the motorcycle frame above ground.

In accordance with still another embodiment of the present invention a method for creating a motorcycle trailer to tow a motorcycle is disclosed comprising, in combination, the steps of providing four substantially L-shaped members each comprising a large cross-section member having a first end and a second end and a small cross-section member having a first end and a second end, the first end of the large cross-section member is coupled to the second end of the small cross-section member, coupling the first end of the small cross-section member of each of the four substantially L-shaped members to the second end of the large cross-section member of any other substantially L-shaped member so as to form a four-sided figure when the second end of the small cross-section member of each substantially L-shaped member is coupled to the first end of the large cross-section member of another substantially L-shaped member, providing four coupling mechanisms each comprising a first mating member coupled to the first end of each small cross-section member of the four substantially L-shaped members and a second mating member coupled to the second end of each large cross-section member of the four substantially L-shaped members, adjusting the four-sided figure with respect to length and width to create a size appropriate to receive a motorcycle tire, mating the first mating member of any one substantially L-shaped member with the second mating member of any other substantially L-shaped member to secure the small cross-section member of any one substantially L-shaped member to the large cross-section member of any other substantially L-shaped member, providing a substantially T-shaped coupler, the coupler comprises a short portion dimensioned to be coupled around one of the four substantially L-shaped members and the coupler comprises a long portion having an end opposite said short portion dimensioned to couple to a vehicle receiver hitch, coupling the short portion of the coupler around one of the four substantially L-shaped members so that the long portion of the coupler extends outside of the four-sided figure in the same plane as the four-sided figure, coupling the long portion of the coupler at the end opposite the short portion to a vehicle receiver hitch, providing a shaft having four sections of descending cross-sectional size, the four sections are dimensioned to nest one inside of another when the shaft is retracted, coupling at least one interior section of the shaft to the coupler so that both ends of the shaft extend away from the coupler in a horizontal direction, providing two substantially L-shaped attachments, coupling the two substantially L-shaped attachments to opposite end sections of the shaft, providing a first tie and a second tie each having a first end and a second end, coupling the first end of the first tie to one of the two substantially L-shaped attachments, coupling the first end of the second tie to the other of the two substantially L-shaped attachments, coupling the second end of the first tie to a portion of a motorcycle, and coupling the second end of the second tie to a portion of a motorcycle.

The foregoing and other objects, features, and advantages of the invention will be apparent from the following, more particular description of the preferred embodiments of the invention, as illustrated in the accompanying drawings.

BRIEF DESCRIPTION OF THE DRAWINGS

FIG. 9 is a perspective view of the apparatus of the present invention in a wheel lock configuration.

FIG. 10 is a perspective view of the configuration of FIG. 9, shown on a motorcycle.

FIG. 11(a) is a perspective view of a receiver hitch adapter, for use with the configuration of FIG. 1.

FIG. 11(b) is a perspective view of an adapter that is designed to raise or lower the apparatus in its FIG. 1 configuration relative to the hitch.

FIG. 11(c) is a perspective view of an adapter that is designed to be used with a car that has a ball rather than a receiver hitch, for use with the apparatus in its FIG. 1 configuration.

FIG. 11(d) is a perspective view of a wrench for tightening and loosening different components that may be provided as a component of the apparatus.

FIG. 11(e) is a perspective view of a receiver hitch extender to be used with the apparatus in its FIG. 1 configuration.

FIG. 11(f) is a perspective view of two attachments attachable to the apparatus in its FIG. 1 configuration in the manner shown in FIG. 4, for purposes of shifting the stress from the motorcycle away from the receiver hitch.

DETAILED DESCRIPTION OF THE PREFERRED EMBODIMENTS

Figure 1:
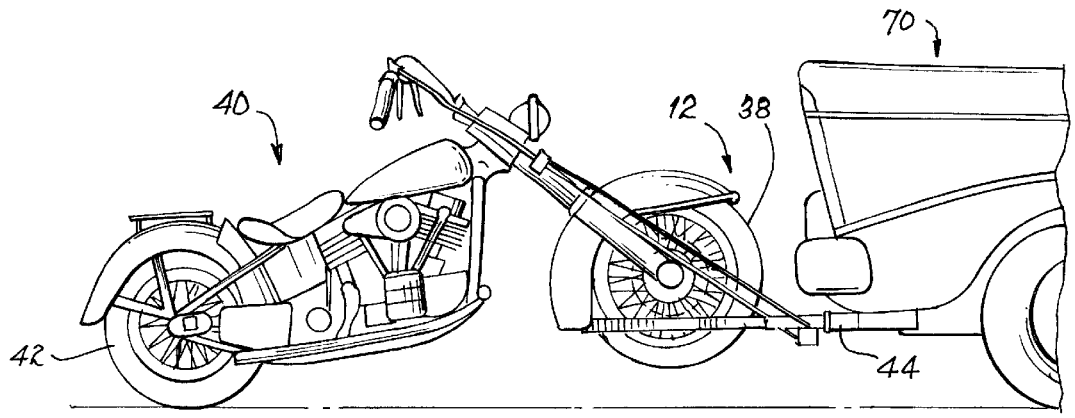
FIG. 1 is a side view showing the apparatus of the present invention in a towing trailer configuration.
Figure 2:
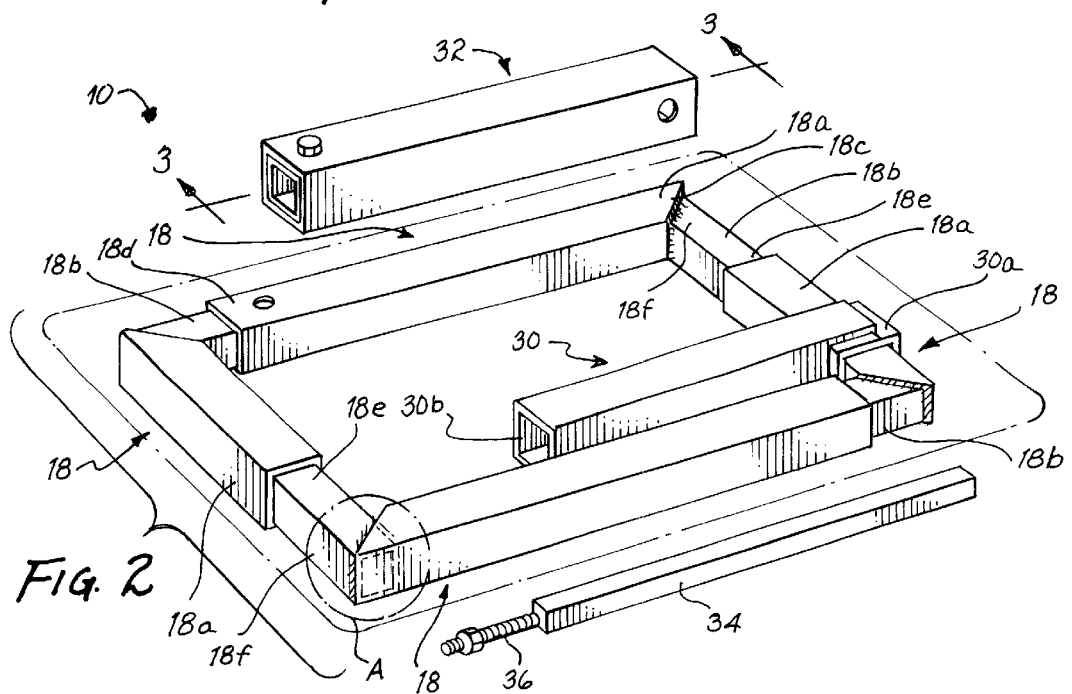
FIG. 2 is a perspective view showing the component portions of the device in a storage configuration—in which configuration the device may be loaded into a motorcycle saddle-bag.
Figure 3:
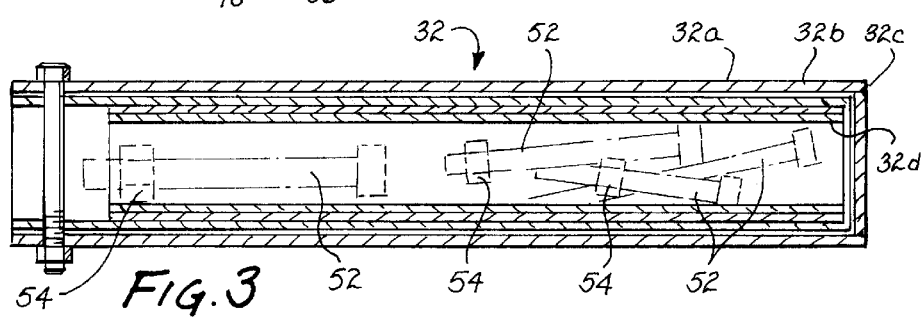
FIG. 3 is a cross-sectional view of one of the portions shown in FIG. 2, taken along line 3—3, and showing the hardware contained therein.

Referring first to FIGS. 2–3, the component portions of a multi-use motorcycle apparatus 10 ("motorcycle apparatus 10") are shown. These component portions can be configured into any of three different apparatuses usable for motorcycles, or placed in the configuration shown in FIG. 2 for transport within a motorcycle saddlebag (or other carrying container). The three apparatuses are: (a) a motorcycle lock 16—shown in FIGS. 9–10; (b) a frame lift 14 for lifting and supporting the frame of a motorcycle that is being repaired—shown in FIGS. 7–8; and (c) a towing trailer 12 for a motorcycle, which trailer 12 is insertable into a vehicle receiver hitch—shown in FIGS. 1 and 4–5.

Still referring to FIGS. 2–3, the motorcycle apparatus 10 comprises four substantially L-shaped members 18, each comprising a large cross-section member 18*a* having a first end 18*c* and a second end 18*d* and a small cross-section member 18*b* having a first end 18*e* and a second end 18*f*. The first end 18*c* of the large cross-section member 18*a* is coupled to the second end 18*f* of the small cross-section member 18*b* while the first end 18*e* of the small cross-section member 18*b* of each of the four substantially L-shaped members 18 is dimensioned to be coupled to the second end 18*d* of the large cross-section member 18*a* of any other substantially L-shaped member 18 so as to form a four-sided figure (as shown for example in FIG. 2) when the second end 18*f* of the small cross-section member 18*b* of each substantially L-shaped member 18 is coupled to the first end 18*c* of the large cross-section member 18*a* of another substantially L-shaped member 18. (The four-sided figure shown in FIG. 2 is a basic feature of each of the three possible configurations of the motorcycle apparatus 10—trailer 12, frame lift 14, and motorcycle lock 16.)

Each of the substantially L-shaped members 18 is preferably formed as shown in area A of FIG. 2, with the second end 18*f* of the small cross-section member 18*b* having a straight end and being inserted into the first end 18*c* of the large cross-section member 18*a* having a end cut at a 45 degree angle, with a weld being placed around the entire circumference of the 45 degree angle end of the large cross-section member 18*a* to create a 45/90 welded section so as to strongly couple the large cross-section member 18*a* to the small cross-section member 18*b*. While, in the preferred embodiment, the use of a 45/90 weld is utilized to couple the large cross-section member 18*a* to the small cross-section member 18*b*, it should be clearly understood that substantial benefit could be derived from an alternative configuration of the multi-use motorcycle apparatus 10 in which the large cross-section member 18*a* and the small cross-section member 18*b* are coupled by another mechanism, such as by nuts and bolts.

Figure 5:
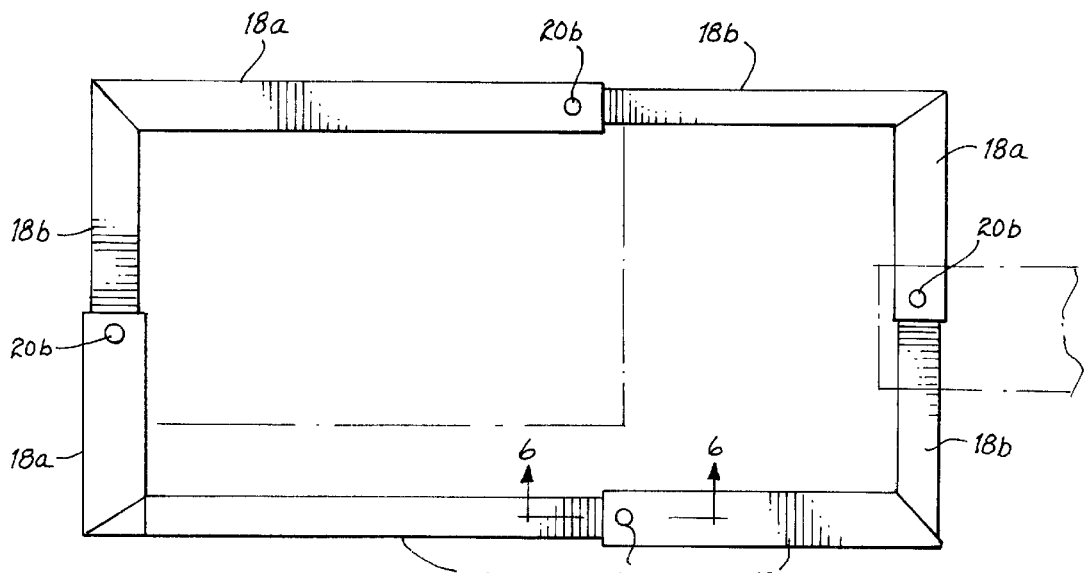
FIG. 5 is a top view of the wheel-receiving portion of the device in the configuration of FIG. 1, illustrating how the size of this portion can be adjusted by adjusting the four L-shaped component portions so as to make the portion wider, narrower, longer or shorter.
Figure 6:
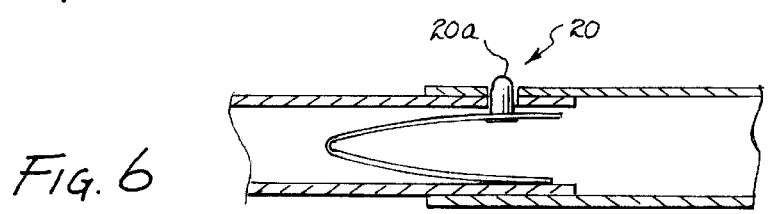
FIG. 6 is a cross-sectional view along line 6—6 of FIG. 5, showing the spring-loaded detents between L-shaped sections.

Referring now to FIG. 6, the manner in which the orientation of the individual L-shaped members 18 to each other can be adjusted is shown. The multi-use motorcycle apparatus 10 further comprises four coupling mechanisms 20 each comprising a first mating member 20*a* and a second mating member 20*b*. The first mating member 20*a* is coupled to the first end 18*e* of each small cross-section member 18*b* of the four substantially L-shaped members 18. The second mating member 20*b* is coupled to the second end 18*d* of each large cross-section member 18*a* of the four substantially L-shaped members 18. The first mating member 20*a* of any one substantially L-shaped member 18 is dimensioned to mate with the second mating member 20*b* of any other substantially L-shaped member 18 to secure the small cross-section member 18*b* of any one substantially L-shaped member 18 to the large cross-section member 18 of any other substantially L-shaped member 18. Preferably, the first mating member 20*a* is a spring-loaded detent. (To guard against the accidental shearing off of a spring-loaded detent 20*a*, a steel insert is preferably positioned within each spring-loaded detent 20*a* to provide added shear strength.) Preferably, the second mating member 20*b* is at least one and preferably more than one opening defined by the second end 18*d* of the large cross-section member 18*a*, and dimensioned to receive a spring-loaded detent 20*a* therein. Adjustment of the width of the four-sided structure shown in FIG. 5 is accomplished by depressing the spring-loaded detents 20*a* along the short sides of that structure, and adjusting the substantially L-shaped members 18 relative to each other so as to increase width (pulling the opposing members farther apart) or to reduce width (pushing the opposing members closer together). Adjustment of the length of the four-sided structures shown in FIG. 5 is accomplished by depressing the spring-loaded detents 20*a* along the long sides of that structure, and adjusting the substantially L-shaped members 18 relative to each other so as to increase length (pulling the opposing members farther apart) or to reduce length (pushing the opposing members closer together).

A. Motorcycle Lock

The construction and operation of the motorcycle lock 16 configuration will now be described, by reference to FIGS. 9–10. The basic component of the motorcycle lock 16 is the four-sided figure formed by the L-shaped members 18. Referring first to FIG. 10, the proper operation of the motorcycle lock 16 requires that it be placed within the spokes (or equivalent structure) of a wheel 66 of a motorcycle 40, so that any attempt to move the motorcycle 40 will cause the motorcycle lock 16 to contact the frame of the motorcycle 40. For such proper placement to take place, the four-sided figure must be separated into two halves of equal width, which width must be sufficient to position the four-sided figure within a wheel 66 between its spokes, as shown in FIG. 10. The halves of the four-sided figure should then be coupled from opposed sides of the wheel 66, so that the four-sided figure extends beyond both sides of the wheel 66. Once in position, a locking mechanism 68 should be passed through corresponding openings in two of the L-shaped members 18, as shown in FIG. 9. The placement of the locking mechanism 68 will prevent the four-sided figure from being pulled apart length-wise, while the spokes of the wheel 66 will prevent the four-sided figure from being pulled apart width-wise.

B. Frame Lift

The construction and operation of the frame lift 14 configuration will now be described by reference to FIGS. 2–3 and 7–8.

Figure 4:
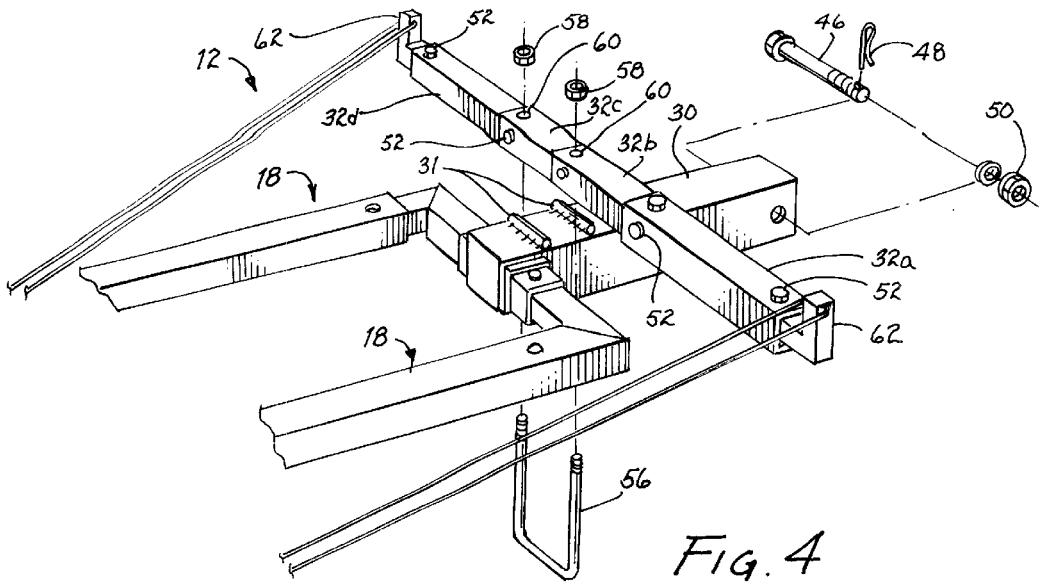
FIG. 4 is a bottom, perspective view of the configuration of FIG. 1.

Referring first specifically to FIG. 2, the motorcycle apparatus 10 preferably further comprises a coupler 30, a substantially T-shaped member comprising a short portion 30*a* dimensioned to be coupled around one of the four substantially L-shaped members 18 (as shown in FIGS. 2 and 4) and the coupler 30 comprises a long portion 30*b* having a female end if opposite the short portion 30*a*. Preferably, on an underside of the long portion 30*b*, as shown in FIG. 4, are formed parallel raised areas 31.

Referring to FIGS. 2–3, the motorcycle apparatus 10 further preferably comprises a shaft 32 comprising four sections 32*a*, 32*b*, 32*c*, and 32*d*, of descending cross-sectional size, dimensioned so that they may nest one inside the other as shown in FIG. 3 for ease of transport. Also for ease of transport, hardware usable with the motorcycle apparatus 10 is preferably transported within the nested shaft 32, as shown in FIG. 3.

Figure 7:
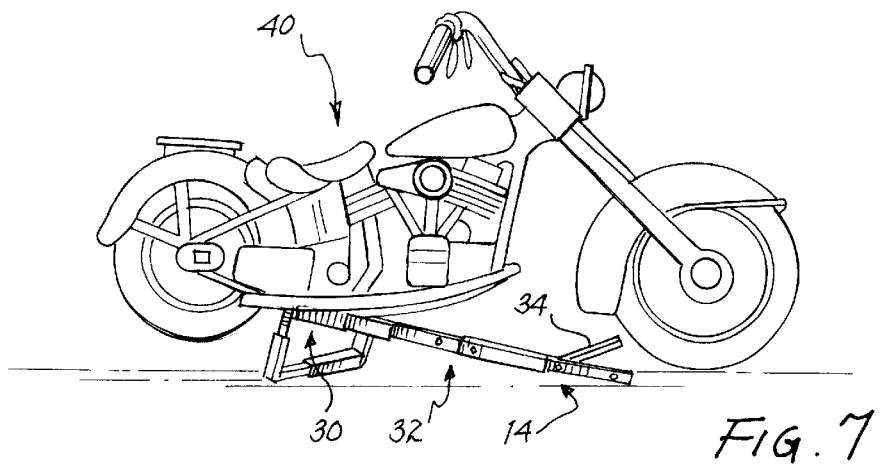
FIG. 7 is a side view of the apparatus of the present invention in a frame lift configuration, supporting a motorcycle frame.
Figure 8:
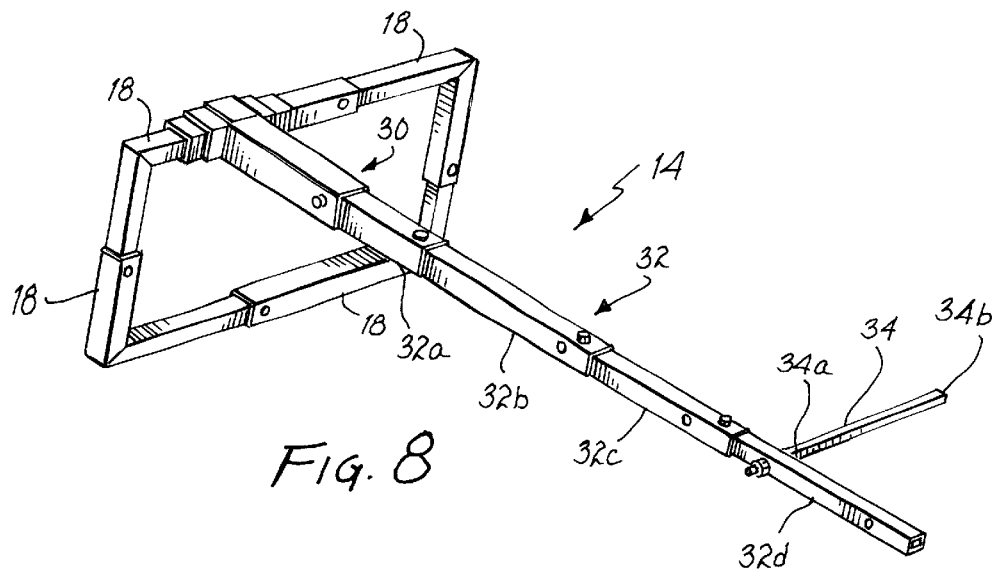
FIG. 8 is a perspective view of the configuration of FIG. 7.

To configure the frame lift 14, it is necessary to position the coupler 30 so that the long portion 30*b* is projecting at a ninety degree angle from the top side of the four-sided figure formed by the L-shaped members 18, as shown in FIGS. 7–8. The four-sided figure formed by the L-shaped members 18 is then adjusted with respect to length and width, in the manner described above, so as to create a size appropriate to receive the particular motorcycle frame to be lifted and to lift it to the desired height. Thus, the wider the motorcycle frame, the longer the desired configuration of the four-sided figure—and vice versa. Moreover, the greater the amount of height that the frame is to be lifted, the wider the desired configuration of the four-sided figure—and vice versa.

Referring to FIG. 8, the component sections 32a, 32b, 32c and 32d of the shaft 32 are secured in relation to each other preferably using bolts 52 and nuts 54 that are preferably stored within the shaft 32d as shown in FIG. 3. (The coupling of the bolts 52 and nuts 54 may be with the assistance of one or more wrenches 55, as shown in FIG. 11(d), which preferably is provided as part of the motorcycle apparatus 10). The bolts 52 are inserted through openings in opposing sides of the component sections of the shaft 32 proximate end portions thereof, as shown in FIG. 4. The assembled shaft 32 is inserted into and coupled to the female end of the long portion 30b of the coupler 30, preferably with bolts 52, nuts 54 and corresponding openings in the long portion 30b of the coupler 30 and section 32a of the shaft 32 in the same manner as described for securing the component sections of the shaft 32. Preferably, to raise the frame of the motorcycle 40, the frame lift 14 is positioned under the motorcycle 40, with the shaft 32 extending in an upward direction. The shaft 32 is then pushed down, with the four-sided figure created by the L-shaped members 18 contacting and then lifting the frame of the motorcycle 40. This process is continued until the end of the shaft 32 opposite the four-sided figure contacts the ground below the motorcycle 40.

Referring again to FIG. 2, the multi-use motorcycle apparatus 10 preferably further comprises a safety bar 34 having a first end 34a and a second end 34b. The first end 34a is dimensioned to be coupled to the shaft 32d and the second end 34b is dimensioned to extend under a portion of a motorcycle 40 and is dimensioned to contact a motorcycle frame when a rear portion of the motorcycle 40 begins to shift in a direction opposite the safety bar 34. In the event of an unexpected shift in weight threatening to cause the motorcycle 40 to fall off the frame lift 14 in a rearward direction and to cause the shaft 32 to swing upward and potentially injure a user, the safety bar 34 will contact the frame of the motorcycle 40 and prevent such injury. Preferably, the first end 34a is comprised of a threaded cylindrical projection 36 dimensioned to mate with a corresponding threaded aperture on the shaft 32d.

C. Trailer Configuration

The construction and operation of the trailer 12 configuration will now be described, by reference to FIGS. 1–4. To configure the trailer 12, it is necessary to position the coupler 30 so that the long portion 30b is projecting outside of the four-sided figure formed by the L-shaped members 18, as shown in FIG. 4. The four-sided figure formed by the L-shaped members 18 is then adjusted with respect to length and width, in the manner described above, so as to create a size appropriate to receive a motorcycle tire 38 as shown in FIG. 1. (While FIG. 1 depicts a front tire being inserted into the trailer 12, it would also be possible to lock the steering wheel of the motorcycle 40 in position, and to insert a rear tire 42 into the trailer 12.)

The long portion 30b of the coupler 30 at the end opposite the short portion 30a is inserted into a receiver hitch 44, and preferably secured in position with a bolt 46 insertable through mating openings in the long portion 30b and the receiver hitch 44, which bolt 46 may be secured with either or both a cotter pin 48 and a nut 50. It is important to note that while the long portion 30b of the coupler 30 is described as having a "female end" in the frame lift 14 configuration above (since this is the end which receives the shaft 32), this same end of the long portion 30b, opposite the short portion 30a, acts as a "male end" in the trailer 12 configuration since this end is inserted into the receiver hitch 44. The end of the long portion 30b opposite the short portion 30a of the coupler 30 can therefore act as either a male end (only when being directly inserted directly into the receiver hitch 44 in the trailer 12 configuration) or a female end (in all remaining configurations).

The shaft 32 is assembled (as described above with respect to the frame lift 14). The assembled shaft 32 is then positioned between the parallel raised areas 32 and secured with preferably a U-shaped clamp 56, which clamp 56 extends through opposing openings 60 in end portions of sections 32b and 32c as indicated in FIG. 4. The clamp 56 is locked into position with nuts 58 as shown. At the ends of the shaft 32 are inserted L-shaped attachments 62 (see also FIG. 11(f)), which are coupled to sections 32a and 32d using bolts 52 and nuts 54 (not shown). Ties 64 are then passed through openings in the L-shaped attachments 62, and are secured to the motorcycle 40, preferably to the handlebars thereof. This use of the shaft 32, L-shaped attachments 62 and ties 64 spreads a portion of the stress from the motorcycle 40 away from the opening of the receiver hitch 44, so as to reduce the risk of damage to the receiver hitch 44 and/or the vehicle 70 during use of the trailer 12.

Occasionally, because of the dimensions or configuration of the vehicle 70, the trailer 12, the receiver hitch 44 or the motorcycle 40, it may be necessary to customize in some manner the coupling of the trailer 12 to the receiver hitch 44. Referring first to FIG. 11(a), a receiver hitch adapter 72 is shown. Some receiver hitches 44 have a reduced-size opening, preventing the insertion of the coupler 30 in the manner described above. For these, a receiver hitch adapter 72 may be used, having a reduced size male end 72a adapted to be coupled to a reduced-size receiver hitch 44, and a male end 72b adapted to be coupled to the coupler 30 and secured thereto in the manner described for coupling section 32a of shaft 32 to the long portion 30b of the coupler 30 in the frame lift 14 configuration. Openings 74 on opposing sides of the receiver hitch adapter 72 are provided, to permit coupling to the receiver hitch 44 and to the coupler 30.

Referring now to FIG. 11(e), a receiver hitch extender 76 is shown. In certain circumstances, for example where the hitch receiver 44 is located relatively distant from the rear of the vehicle 70, it is necessary to provide an extension to bridge the distance between the hitch receiver 44 and the trailer 12. For these situations, a hitch receiver extender 76 may be used, having a first male end 76a adapted to be coupled to the receiver hitch 44, and a second male end 76b adapted to be inserted into the coupler 30 in the same manner described for coupling section 32a of shaft 32 to the long portion 30b of the coupler 30 in the frame lift 14 configuration. Openings 78 on opposing sides of the hitch receiver extender 76 are provided, to permit coupling to the receiver hitch 44 and to the coupler 30.

On some vehicles, in place of a standard hitch receiver 44, a trailer ball (not shown) is provided. Typically, in such instances, the trailer ball is bolted to the bumper of the vehicle 70 through an opening in the bumper. Referring now to FIG. 11(c), to permit the use of the trailer 12 with a trailer ball, an adapter 80 is provided. The adapter 80 comprises a flat portion 80a and a male portion 80b. In use, the trailer ball will be removed, and the flat portion 80a positioned so that the opening 82 therein is aligned with the opening that receives the trailer ball. The trailer ball is then reattached, with the flat portion 80a sandwiched between the trailer ball and bumper. The male portion 80b may then be inserted into the coupler 30, and coupled thereto through openings 84 in the male end 80b.

FIG. 11(*b*) illustrates a height adapter 86. In certain circumstances, for example when the vehicle 70 is particularly high profile or low profile, it may not be possible to directly couple the trailer 12 to the hitch receiver 44. In such instances, it may be necessary for the trailer 12 to be positioned higher or lower than the receiver hitch 44. The height adapter 86 permits such positioning. The height adapter 86 comprises a first substantially L-shaped member 86a and a second substantially L-shaped member 86b. The first substantially L-shaped member 86a has a first male end 86c and a second male end 86d. The second substantially L-shaped member 86b has a male end 86e and a female end 86f. Where the trailer 10 needs to be positioned higher than the receiver hitch 44, the first male end 86c of the substantially L-shaped member 86a will be positioned and secured within the receiver hitch 44 as discussed above, oriented so that the second male end 86d is projecting upward. The female end 86f of the substantially L-shaped member 86b is then positioned over the upward oriented male end 86d of the substantially L-shaped member 86a, and oriented so that the male end 86e of the substantially L-shaped member 86b projects outward from the vehicle 70. The male end 86e of the substantially L-shaped member 86b is inserted into the coupler 30 and secured in the manner described above. Where the trailer 12 is to be positioned lower than the receiver hitch 44, the coupling of the substantially L-shaped members 86a and 86b is as described above, with the difference being that the substantially L-shaped member 86a is inserted into the receiver hitch 44 with the second male end 86d in a downward rather than upward projecting orientation. Preferably, a plurality of openings 88 are provided on the female end 86f of the substantially L-shaped member 86b to provide a further element of height adjustment.

While the invention has been particularly shown and described with reference to preferred embodiments thereof, it will be understood by those skilled in the art that the foregoing and other changes in form and details may be made therein without departing from the spirit and scope of the invention.

I claim:

1. A multi-use motorcycle apparatus comprising, in combination:

four substantially L-shaped members each comprising a large cross-section member having a first end and a second end and a small cross-section member having a first end and a second end, said first end of said large cross-section member is coupled to said second end of said small cross-section member, said first end of said small cross-section member of each of said four substantially L-shaped members is dimensioned to be coupled to said second end of said large cross-section member of any other said substantially L-shaped member so as to form a four-sided figure when said second end of said small cross-section member of each substantially L-shaped member is coupled to said first end of said large cross-section member of another substantially L-shaped member; and four coupling mechanisms each comprising a first mating member coupled to said first end of each said small cross-section member of said four substantially L-shaped members and a second mating member coupled to said second end of each said large cross-section member of said four substantially L-shaped members, said first mating member of any one said substantially L-shaped member is dimensioned to mate with said second mating member of any other said substantially L-shaped member to secure said small cross-section member of any one said substantially L-shaped member to said large cross-section member of any other said substantially L-shaped member.

2. The multi-use motorcycle apparatus of claim 1 wherein said first end of said large cross-section member of each of said four substantially L-shaped members is cut at a substantially 45 degree angle and said second end of said substantially small cross-section of each of said four substantially L-shaped members is substantially straight, said first end of said large cross-section member and said second end of said small cross-section member are coupled by a weld around a circumference of said 45 degree angle to create a 45/90 welded section.

3. The multi-use motorcycle apparatus of claim 1 further comprising a locking mechanism dimensioned to couple said second end of said small cross-section member of one of said four substantially L-shaped members to said first end of said large cross-section member of another of said four substantially L-shaped members along the length of said four-sided figure after said four-sided figure is formed within spokes of a motorcycle wheel, said locking mechanism is dimensioned to prevent said four-sided figure from being pulled apart length-wise while at the same time said spokes of said motorcycle wheel prevent said four-sided figure from being pulled apart width-wise, said four-sided figure contacts a motorcycle frame when said motorcycle wheel is rotated.

4. The multi-use motorcycle apparatus of claim 1 further comprising a substantially T-shaped coupler, said coupler comprises a short portion dimensioned to be coupled around one of said four substantially L-shaped members and said coupler comprises a long portion having an end opposite said short portion dimensioned to couple to a vehicle receiver hitch.

5. The multi-use motorcycle apparatus of claim 4 further comprising a shaft having four sections of descending cross-sectional size, said four sections are dimensioned to nest one inside of another, said shaft is dimensioned to be coupled to said long portion of said coupler at said end opposite said short portion of said coupler.

6. The multi-use motorcycle apparatus of claim 5 further comprising:

two substantially L-shaped attachments coupled at opposite end sections of said shaft;

a first tie having a first end and a second end, said first end is coupled through an opening in one of said two L-shaped attachments and said second end is coupled to a portion of a motorcycle; and a second tie having a first end and a second end, said first end is coupled through an opening in the other of said two L-shaped attachments and said second end is coupled to a portion of a motorcycle.

7. The multi-use motorcycle apparatus of claim 4 further comprising a receiver hitch adapter having a reduced size male end adapted to be coupled to a reduced-size receiver hitch, and a male end adapted to be coupled to said long portion of said coupler at said end opposite said short portion of said coupler.

8. The multi-use motorcycle apparatus of claim 4 further comprising a receiver hitch extender having a first male end adapted to be coupled to said receiver hitch and a second male end adapted to be coupled to said long portion of said coupler at said end opposite said short portion of said coupler.

9. The multi-use motorcycle apparatus of claim 4 further comprising a trailer ball adapter having a flat portion defining an opening therethrough and a male portion, said flat portion is coupled to a bumper portion of a vehicle between a top portion of said bumper portion and a bottom end of a trailer ball, said bottom end of said trailer ball is dimensioned to be inserted through said opening of said flat portion, said male portion of said trailer ball adapter is adapted to be coupled to said long portion of said coupler at said end opposite said short portion of said coupler.

10. The multi-use motorcycle apparatus of claim 4 further comprising a height adapter comprising a first substantially L-shaped member having a first male end and a second male end, and a second substantially L-shaped member having a male end and a female end, said first male end of said first substantially L-shaped member of said height adapter is dimensioned to be coupled to said receiver hitch and said second male end is dimensioned to be coupled to said female end of said second substantially L-shaped member of said height adapter, said male end of said second substantially L-shaped member of said height adapter is dimensioned to be coupled to said long portion of said coupler at said end opposite said short portion of said coupler.

11. The multi-use motorcycle apparatus of claim 4 further comprising a safety bar having a first end and a second end, said first end is dimensioned to be coupled to a portion of said shaft opposite said coupler said portion of said shaft dimensioned to be coupled to said coupler, said second end of said safety bar is dimensioned to extend under a portion of a motorcycle and is dimensioned to contact a motorcycle frame when a rear portion of said motorcycle begins to shift in a direction opposite said safety bar.

12. A method for lifting the frame of a motorcycle comprising, in combination, the steps of:
    providing four substantially L-shaped members each comprising a large cross-section member having a first end and a second end and a small cross-section member having a first end and a second end, said first end of said large cross-section member is coupled to said second end of said small cross-section member;
    coupling said first end of said small cross-section member of each of said four substantially L-shaped members to said second end of said large cross-section member of any other said substantially L-shaped member so as to form a four-sided figure when said second end of said small cross-section member of each substantially L-shaped member is coupled to said first end of said large cross-section member of another substantially L-shaped member;
    providing four coupling mechanisms each comprising a first mating member coupled to said first end of each said small cross-section member of said four substantially L-shaped members and a second mating member coupled to said second end of each said large cross-section member of said four substantially L-shaped members;
    mating said first mating member of any one said substantially L-shaped member with said second mating member of any other said substantially L-shaped member to secure said small cross-section member of any one said substantially L-shaped member to said large cross-section member of any other said substantially L-shaped member;
    providing a substantially T-shaped coupler, said coupler comprises a short portion dimensioned to be coupled around one of said four substantially L-shaped members and said coupler comprises a long portion having a female end opposite said short portion;
    coupling said short portion of said coupler around one of said four substantially L-shaped members;
    providing a shaft having four sections of descending cross-sectional size, said four sections are dimensioned to nest one inside of another;
    coupling the largest section of said shaft to said female end of said long portion of said coupler, said remaining sections of descending cross-sectional size extend away from said four substantially L-shaped members;
    positioning said coupler so that said long portion is projecting at a ninety degree angle from the top side of said four-sided figure formed by said L-shaped members;
    placing said four-sided figure under a motorcycle frame with said shaft extending in an upward direction; and
    pushing down said shaft until said four-sided figure contacts and then lifts said motorcycle frame above ground.

13. The method of claim 12 further comprising the steps of:
    providing a safety bar having a first end and a second end; and
    coupling said first end of said safety bar to a portion of said shaft opposite said coupler, said second end of said safety bar is dimensioned to extend under a portion of a motorcycle and is dimensioned to contact a motorcycle frame when a rear portion of said motorcycle begins to shift in a direction opposite said safety bar.

14. The method of claim 12 further comprising the step of adjusting said four-sided figure with respect to length and width to create a size appropriate to receive a particular ski motorcycle frame to be lifted.

15. A method for creating a motorcycle trailer to tow a motorcycle comprising, in combination, the steps of:
    providing four substantially L-shaped members each comprising a large cross-section member having a first end and a second end and a small cross-section member having a first end and a second end, said first end of said large cross-section member is coupled to said second end of said small cross-section member;
    coupling said first end of said small cross-section member of each of said four substantially L-shaped members to said second end of said large cross-section member of any other said substantially L-shaped member so as to form a four-sided figure when said second end of said small cross-section member of each substantially L-shaped member is coupled to said first end of said large cross-section member of another substantially L-shaped member;
    providing four coupling mechanisms each comprising a first mating member coupled to said first end of each said small cross-section member of said four substantially L-shaped members and a second mating member coupled to said second end of each said large cross-section member of said four substantially L-shaped members;
    adjusting said four-sided figure with respect to length and width to create a size appropriate to receive a motorcycle tire;
    mating said first mating member of any one said substantially L-shaped member with said second mating member of any other said substantially L-shaped member to secure said small cross-section member of any one said substantially L-shaped member to said large cross-section member of any other said substantially L-shaped member;

providing a substantially T-shaped coupler, said coupler comprises a short portion dimensioned to be coupled around one of said four substantially L-shaped members and said coupler comprises a long portion having an end opposite said short portion dimensioned to couple to a vehicle receiver hitch;

coupling said short portion of said coupler around one of said four substantially L-shaped members so that said long portion of said coupler extends outside of said four-sided figure in the same plane as said four-sided figure;

coupling said long portion of said coupler at said end opposite said short portion to a vehicle receiver hitch;

providing a shaft having four sections of descending cross-sectional size, said four sections are dimensioned to nest one inside of another when said shaft is retracted;

coupling at least one interior section of said shaft to said coupler so that both ends of said shaft extend away from said coupler in a horizontal direction;

providing two substantially L-shaped attachments;

coupling said two substantially L-shaped attachments to opposite end sections of said shaft;

providing a first tie and a second tie each having a first end and a second end;

coupling said first end of said first tie to one of said two substantially L-shaped attachments;

coupling said first end of said second tie to the other of said two substantially L-shaped attachments;

coupling said second end of said first tie to a portion of a motorcycle; and coupling said second end of said second tie to a portion of a motorcycle.

16. The method of claim 15 further comprising the steps of:

providing a receiver hitch adapter having a reduced-size male end and a male end;

coupling said reduced-size male end to a reduced-size receiver hitch; and coupling said male end to said long portion of said coupler at said end opposite said short portion of said coupler.

17. The method of claim 15 further comprising the steps of:

providing a receiver hitch extender having a first male end and a second male end;

coupling said first male end to said receiver hitch; and coupling said second male end to said long portion of said coupler at said end opposite said short portion of said coupler.

18. The method of claim 15 further comprising the steps of:

providing a trailer ball adapter having a flat portion defining an opening therethrough and a male portion;

placing said flat portion on a top portion of a bumper portion of a vehicle;

inserting a bottom end of a trailer ball through said opening in said flat portion;

coupling said bottom end of said trailer ball to said flat portion of said trailer ball adapter; and coupling said male portion of said trailer ball to said long portion of said coupler at said end opposite said short portion of said coupler.

19. The method of claim 15 further comprising the steps of:

providing a height adapter comprising a first substantially L-shaped member having a first male end and a second male end, and a second substantially L-shaped member having a male end and a female end;

coupling said first male end of said first substantially L-shaped member of said height adapter to said receiver hitch so that said second male end of said first substantially L-shaped member projects upward;

my coupling said second male end of said first substantially L-shaped member of said height adapter to said female end of said second substantially L-shaped member of said height adapter so that said male end of said second substantially L-shaped member of said height adapter projects outward from a vehicle; and coupling said male end of said second substantially L-shaped member of said height adapter to said long portion of said coupler at said end opposite said short portion of said coupler.

20. The method of claim 15 further comprising the steps of:

providing a height adapter comprising a first substantially L-shaped member having a first male end and a second male end, and a second substantially L-shaped member having a male end and a female end;

coupling said first male end of said first substantially L-shaped member of said height adapter to said receiver hitch so that said second male end of said first substantially L-shaped member projects downward;

coupling said second male end of said first substantially L-shaped member of said height adapter to said female end of said second substantially L-shaped member of said height adapter so that said male end of said second substantially L-shaped member of said height adapter projects outward from a vehicle; and coupling said male end of said second substantially L-shaped member of said height adapter to said long portion of said coupler at said end opposite said short portion of said coupler.

* * * * *